US010988206B1

United States Patent
Chang (10) Patent No.: US 10,988,206 B1
(45) Date of Patent: Apr. 27, 2021

(54) ASSISTANCE SYSTEM FOR FACILITATING OPERATION OF ELECTRIC CYCLE

(71) Applicants: YANGDING (TIANJIN) TECHNOLOGY CO., LTD., Tianjin (CN); Fu-Long Chang, Chiayi (TW)

(72) Inventor: Fu-Long Chang, Chiayi (TW)

(73) Assignees: YANGDING (TIANJIN) TECHNOLOGY CO., LTD., Tianjin (CN); Fu-Long Chang, Chiayi (TW)

( * ) Notice: Subject to any disclaimer, the term of this patent is extended or adjusted under 35 U.S.C. 154(b) by 0 days.

(21) Appl. No.: 17/044,788

(22) PCT Filed: Mar. 29, 2019

(86) PCT No.: PCT/CN2019/080498
§ 371 (c)(1),
(2) Date: Oct. 1, 2020

(87) PCT Pub. No.: WO2019/192404
PCT Pub. Date: Oct. 10, 2019

(30) Foreign Application Priority Data

Apr. 1, 2018 (CN) .......................... 201810279882.8

(51) Int. Cl.
*B62M 6/50* (2010.01)
*B62J 43/13* (2020.01)
(Continued)

(52) U.S. Cl.
CPC ................ *B62M 6/50* (2013.01); *B62J 43/13* (2020.02); *B62J 45/20* (2020.02); *B62J 45/412* (2020.02);
(Continued)

(58) Field of Classification Search
CPC . B62M 6/50; B62M 6/60; B62M 6/55; B62M 6/90; B62J 45/412; B62J 45/20;
(Continued)

(56) References Cited

U.S. PATENT DOCUMENTS 8,981,593 B1 * 3/2015 Kimpel ..................... H02J 1/10
307/29
2012/0086183 A1 * 4/2012 Ken ....................... B60C 19/127
280/260

(Continued)

FOREIGN PATENT DOCUMENTS

| CN | 102826160 A | 12/2012 |
| CN | 105574278 A | 5/2016 |

(Continued)

*Primary Examiner* — Kevin Hurley
*Assistant Examiner* — Marlon A Arce
(74) *Attorney, Agent, or Firm* — Muncy, Geissler, Olds & Lowe, P.C.

(57) ABSTRACT

An assistance system includes a resistance detecting unit obtaining a resistance factor, a database storing starting torque values and operating torque values, a torque calculation unit including a controller, and a torque-control handlebar grip operated to trigger an assigned gain and to tune the same to be provided to the torque calculation unit. When switched to an aided mode, the controller calculates a compensated torque value based on one of the starting/operating torque values and the resistance factor, calculates an output torque value by a product of the compensated torque value, the assist ratio and the assigned gain, and controls a torque motor to drive rotation of a driving wheel based on the output torque value.

14 Claims, 6 Drawing Sheets

(51) Int. Cl.
*B62K 23/02* (2006.01)
*B62J 45/412* (2020.01)
*B62J 45/20* (2020.01)
*B62L 3/02* (2006.01)
*B62M 6/60* (2010.01)
*B62J 45/415* (2020.01)
*B62M 6/55* (2010.01)
*B62M 6/90* (2010.01)

(52) U.S. Cl.
CPC ........... *B62J 45/4151* (2020.02); *B62K 23/02* (2013.01); *B62L 3/02* (2013.01); *B62M 6/60* (2013.01); *B62M 6/55* (2013.01); *B62M 6/90* (2013.01)

(58) Field of Classification Search
CPC ......... B62J 45/4151; B62J 43/13; B62L 3/02; B62K 23/02
See application file for complete search history.

(56) References Cited

U.S. PATENT DOCUMENTS

| | | | |
|---|---|---|---|
| 2018/0244342 A1* | 8/2018 | Macmartin | H02K 11/20 |
| 2018/0370591 A1* | 12/2018 | Denninger | B62B 5/00 |
| 2019/0031284 A1* | 1/2019 | Fuchs | B60L 50/40 |
| 2020/0130777 A1* | 4/2020 | Yamazaki | B62M 6/45 |
| 2020/0262512 A1* | 8/2020 | Hahn | B62M 9/122 |

FOREIGN PATENT DOCUMENTS

| | | |
|---|---|---|
| CN | 108516039 A | 9/2018 |
| EP | 2621795 A1 | 8/2013 |
| JP | 2014193684 A | 10/2014 |

\* cited by examiner

ASSISTANCE SYSTEM FOR FACILITATING OPERATION OF ELECTRIC CYCLE

FIELD

The disclosure relates to an assistance system, and more particularly to an assistance system for facilitating operation of an electric cycle.

BACKGROUND

To ride an electric bicycle on a local bikeway in the European Union or Japan, a power assist ratio, that is a ratio of electric propulsion power to rider-pedaling power, must meet local regulations. Therefore, with regard to conventional design of auxiliary propulsion power control of an electric bicycle, which may be a product of Bosch in Germany, or Panasonic, Yamaha, or Shimano in Japan, a cyclist has to set the assist ratio prior to starting riding of the electric bicycle. During riding such kind of the electric bicycle, a torque detector is used to detect rider's pedaling torque in real time, and provides a result of detection to a controller of the electric bicycle for determining a value of the electric propulsion power corresponding to rider's pedaling torque. For example, an assist ratio that is set to have a value of 75% means that human pedal power of pedaling the electric bicycle should exceed 25 percent of the total power of propelling the electric bicycle, and the electric propulsion power is restricted to be at most 75 percent of the total power of propelling the electric bicycle.

Moreover, the conventional design of auxiliary propulsion power control does not take into account resistance factors that work against forward movement of the electric bicycle, e.g., moving against the wind, climbing a hill, riding with a heavy load, or poor road surface. In addition, the conventional design of auxiliary propulsion power control usually adopts a feed-afterward control scheme where the rider must exert force before the power-assist force is involved, resulting in a latency of response in the auxiliary propulsion power control.

SUMMARY

Therefore, an object of the disclosure is to provide an assistance system for facilitating operation of an electric cycle that can alleviate at least one of the drawbacks of the prior art.

According to the disclosure, the electric cycle includes a cycle body, a driving wheel, a cycle drivetrain, a battery, and a torque motor adapted to exert torque to the driving wheel. The assistance system is to be mounted on the cycle body and to be electrically connected to the battery and the torque motor. The assistance system includes a resistance detecting unit, a database, a torque calculation unit and a torque-control handlebar grip.

The resistance detecting unit is configured to obtain a resistance factor that works against forward movement of the electric cycle.

The database is configured to store a set of starting torque values each of which is a value of torque for initiating rotation of the driving wheel from a standstill under influence of the resistance factor, and a set of operating torque values each of which is a value of torque for maintaining the rotation of the driving wheel at a constant rotational speed under the influence of the resistance factor.

The torque calculation unit includes a controller switchable between an aided mode and an exercise mode.

The torque-control handlebar grip is configured to be operated to trigger an assigned gain and to tune the assigned gain that is to be provided to the torque calculation unit.

The controller is configured to, when the controller is switched to the aided mode, determine one of the starting torque values or one of the operating torque values based on the resistance factor obtained by the resistance detecting unit to serve as an assist torque value. The controller is configured to calculate a compensated torque value based on the assist torque value and the resistance factor obtained by the resistance detecting unit. The controller is configured to multiply the compensated torque value by the assigned gain to obtain an output torque value. The controller is configured to control the torque motor to drive the rotation of the driving wheel based on the output torque value.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
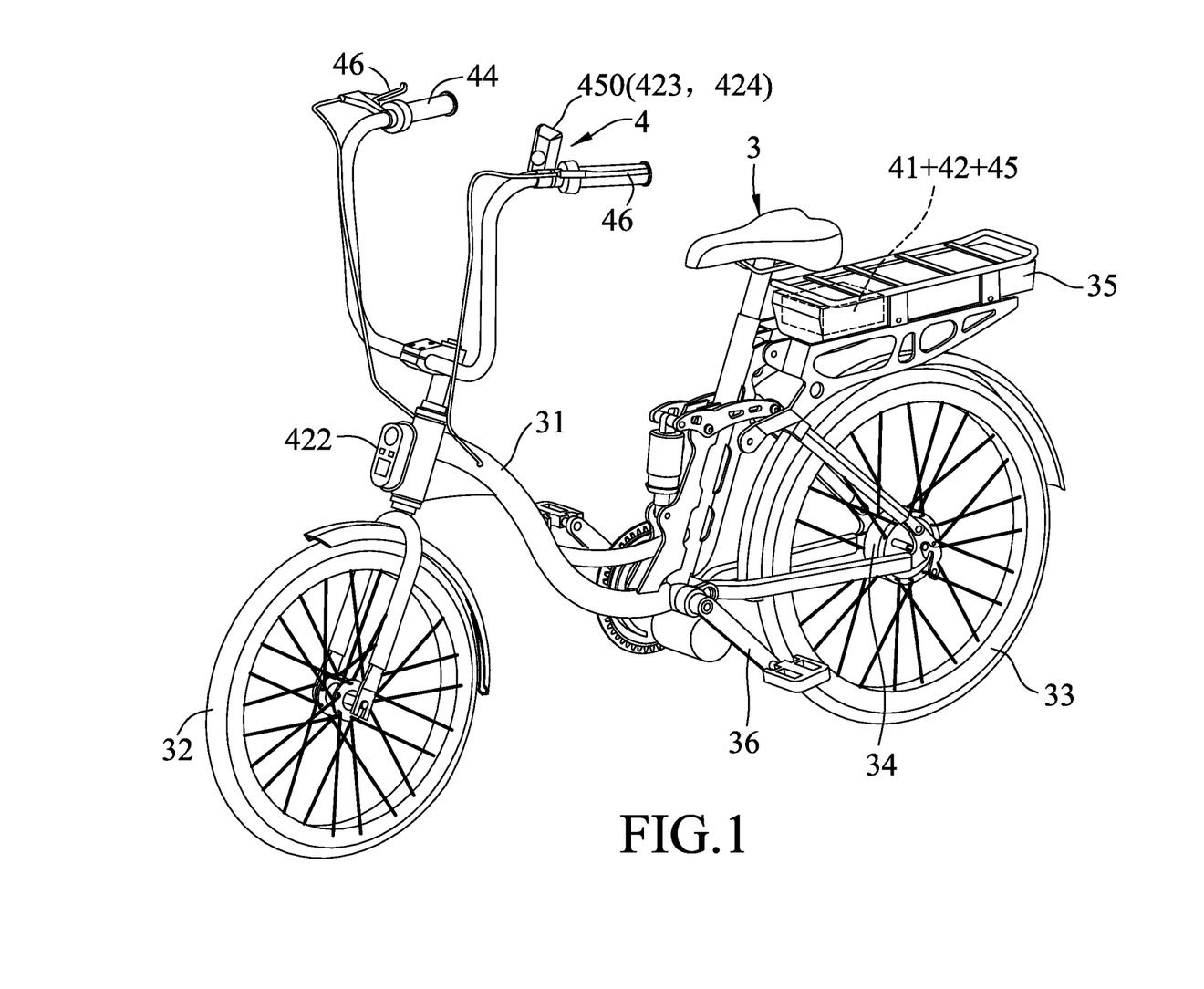
FIG. 1 is a perspective view illustrating an embodiment of an assistance system for facilitating operation of an electric cycle according to the disclosure.
Figure 2:
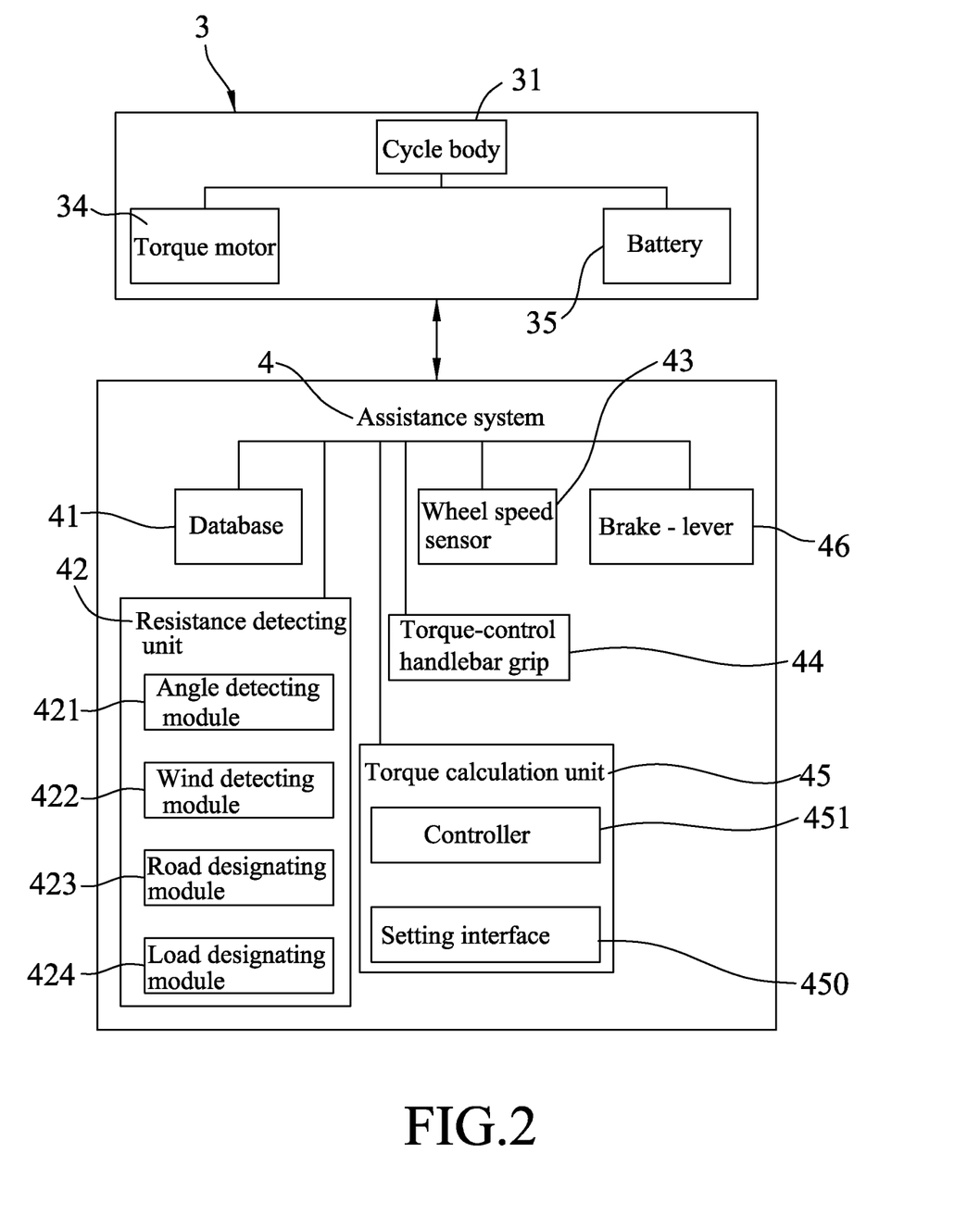
FIG. 2 is a block diagram illustrating the embodiment of the assistance system according to the disclosure.

Referring to FIGS. 1 and 2, an embodiment of an assistance system 4 for facilitating operation of an electric cycle 3 is illustrated. The electric cycle 3 includes a cycle body 31, a front wheel 32 and a rear wheel (which is a driving wheel 33) spaced apart from each other and coupled to the cycle body 31, a cycle drivetrain 36 coupled to the cycle body 31 and the driving wheel 33, a torque motor 34 coupled to the cycle body 31, and a battery 35 installed on the cycle body 31. In another embodiment, the driving wheel 33 may be the front wheel 2. The cycle drivetrain 36 is to be pedaled to drive rotation of the driving wheel 33. In one embodiment, two torque motors 34 are respectively coupled to the cycle drivetrain 36 and the driving wheel 33. However, in this embodiment, only one torque motor is required, and the torque motor may be coupled to the cycle drivetrain 36 or to the driving wheel 33. The battery 35 is electrically connected to the torque motor 34 and the assistance system 4, and is configured to supply electrical power to the torque motor 34 and the assistance system 4. In this embodiment, the electric cycle 3 is implemented to be an electric bicycle, but implementation is not limited to the disclosure herein and may vary in other embodiments.

The assistance system 4 is to be mounted on the cycle body 31 and is to be electrically connected to the torque motor 34. Driven by the assistance system 4, the torque motor 34 is adapted to exert torque through the cycle drivetrain 36 to the driving wheel 33. The torque motor 34 may be implemented to be an integrated hub motor mounted on the driving wheel 33, a mid-drive motor coupled to the cycle drivetrain 36, a servomotor, a step motor, a switched reluctance motor, or any electric torque motor capable of realizing all functions mentioned in this disclosure. However, implementation of the torque motor 34 is not limited to the disclosure herein and may vary in other embodiments. In addition, in one embodiment, the electric cycle 3 includes only one torque motor 34. It should be noted that the torque motor 34 should not burn out when the torque motor 34 gets stuck.

The assistance system 4 includes a database 41, a resistance detecting unit 42, a wheel speed sensor 43, a torque-control handlebar grip 44, a brake-lever 46, and a torque calculation unit 45 that is communicable with the database 41, the resistance detecting unit 42, the wheel speed sensor 43, the torque-control handlebar grip 44 and the brake-lever 46.

In this embodiment, the wheel speed sensor 43 is disposed in the torque motor 34, but disposition of the wheel speed sensor 43 is not limited thereto. The wheel speed sensor 43 is configured to detect a rotational speed of the driving wheel 33, and to transmit a result of detection to the torque calculation unit 45.

The torque-control handlebar grip 44 is mounted to a handlebar of the cycle body 31 as shown in FIG. 1, and is configured to be operated to trigger an assigned gain and to tune the assigned gain that is to be provided to the torque calculation unit 45 for adjusting torque to be exerted by the torque motor 34. In this embodiment, the torque-control handlebar grip 44 is implemented to be operated by twisting similar to the operation of a throttle twist grip of a motorcycle. The torque-control handlebar grip 44 is operated by twisting to adjust a value of the assigned gain which is proportional to an amount of twist, and may be further operated to trigger the assistance system 4 to interact with the torque motor 34 for facilitating operating the electric cycle 3 through driving the torque motor 34. For example, the value of the assigned gain is zero when a twisted angle of the torque-control handlebar grip 44 is zero. The value of the assigned gain is increased along with increasing twisted angle. In some cases, the value of the assigned gain may be increased beyond 100%. In another embodiment, the torque-control handlebar grip 44 may be operated to output a switch signal to activate or deactivate the assistance system 4 which is configured to facilitate operation of the electric cycle 3.

The resistance detecting unit 42 is configured to obtain a resistance factor that works against forward movement of the electric cycle 3.

The database 41 is configured to store a plurality of starting torque values each of which is a value of torque for initiating rotation of the driving wheel 33 from a standstill under influence of the resistance factor, and a plurality of operating torque values each of which is a value of torque for maintaining the rotation of the driving wheel 33 at a constant rotational speed under the influence of the resistance factor. Each of the operating torque values corresponds to a range of values of the rotational speed of the driving wheel 33.

Specifically speaking, in this embodiment, the resistance detecting unit 42 includes an angle detecting module 421, a wind detecting module 422, a road designating module 423, and a load designating module 424 that are mounted on the cycle body 31.

Figure 4:
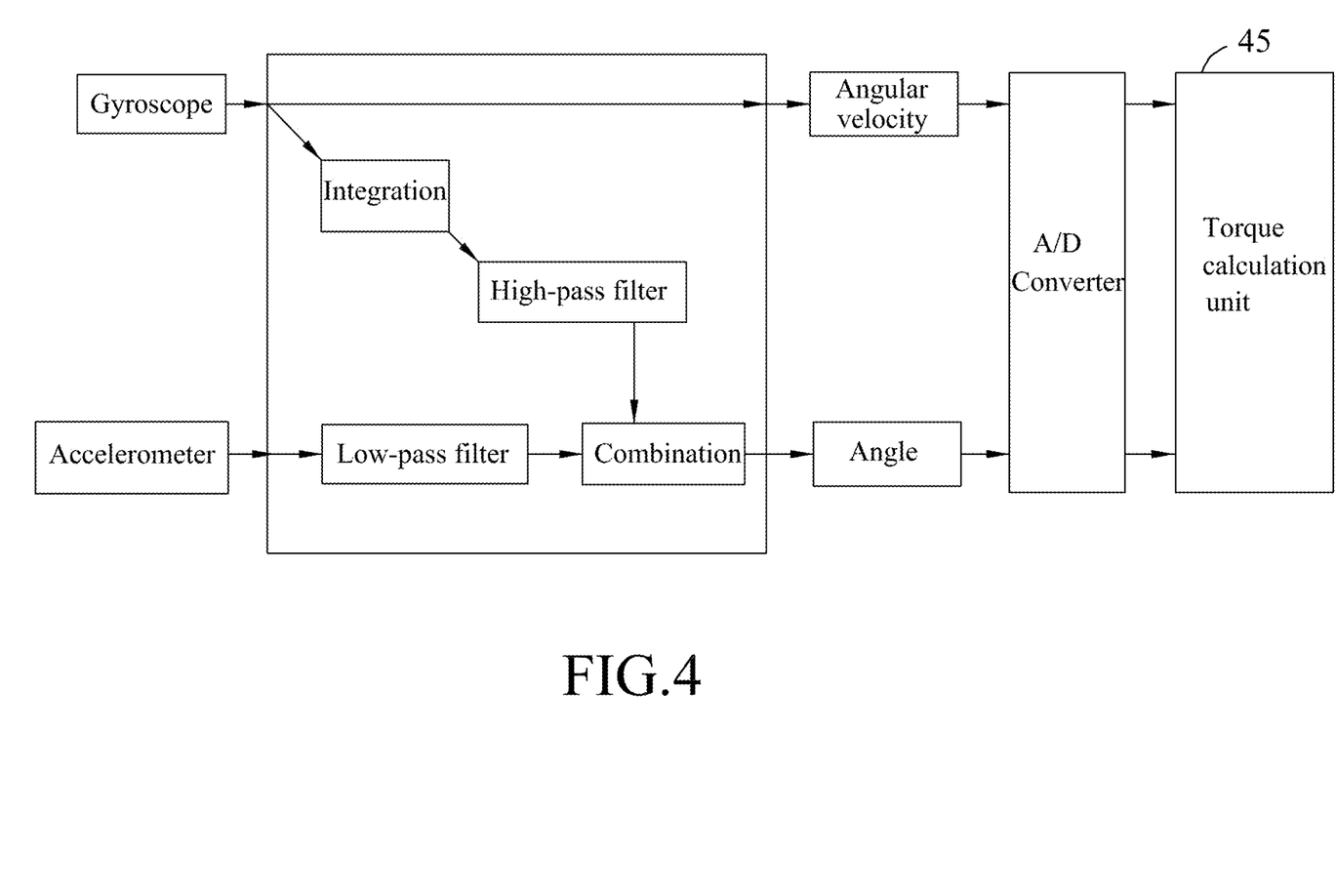
FIG. 4 is a schematic diagram illustrating an embodiment of an angle detecting module of a resistance detecting unit of the assistance system according to the disclosure.

The angle detecting module 421 is configured to detect an inclination angle of the cycle body 31 with respect to a horizontal plane. The inclination angle serves as an element of the resistance factor, and cooperates with the rotational speed of the driving wheel 33 detected by the wheel speed sensor 43 for determination of said one of the starting torque values or one of the operating torque values to serve as an assist torque value. Referring to FIG. 4, in this embodiment, the angle detecting module 421 is implemented by a combination of a gyroscope, an accelerometer, a high-pass filter, a low-pass filter and an A/D converter. Such implementation has been widely applied to electric balancing vehicles, and is capable of calculating the inclination angle, and a curvature of road surface and an acceleration of the electric cycle as well. In one embodiment, the angle detecting module 421 may be an inclinometer, a clinometer, a tilt sensor, a tilt indicator or a tilt meter which is able to detect the inclination of the electric cycle 3 with respect to the horizontal plane.

Since the aforementioned implementation of the angle detecting module 421 has been well known to one skilled in the relevant art, detailed explanation of the same is omitted herein for the sake of brevity.

The wind detecting module 422 is mounted on a head tube of the cycle body as shown in FIG. 1. The wind detecting module 422 is configured to detect wind resistance received by the head tube of the electric cycle 3 to serve as an element of the resistance factor. In this embodiment, the wind detecting module 422 is implemented to be an anemometer. Specifically, the wind detecting module 422 is a digital vane anemometer available on the market, but implementation thereof is not limited to the disclosure herein and may vary in other embodiments.

The road designating module 423 is configured to be operated to designate a road surface condition which serves as an element of the resistance factor for determination of said one of the starting torque values or one of the operating torque values to serve as the assist torque value. The road surface condition may be implemented to be associated with roads of asphalt pavement, soil surface, concrete surface, gravel surface, irregular surface and so on.

The load designating module 424 is configured to be operated to designate a loaded weight which serves as an element of the resistance factor for determination of said one of the starting torque values or one of the operating torque values to serve as the assist torque value. The loaded weight is associated with a weight of total load on the electric cycle 3.

In this embodiment, the database 41 stores a plurality of assist-torque lookup tables. One of the assist-torque lookup tables is configured to be selected among the plurality of assist-torque lookup tables based on the road surface condition thus designated and the loaded weight thus designated to serve as a working lookup table for determination of the assist torque value. Moreover, for each of the assist-torque lookup tables, a combination of a value of the rotational speed thus detected and a value of the inclination angle thus detected can be utilized to look up the assist torque value (A3) in the assist-torque lookup table (see FIG. 6), wherein the starting torque values are elements contained in the assist-torque lookup tables and corresponding to the rotational speed that is of a zero value, and the operating torque values are other elements contained in the assist-torque lookup tables and corresponding to the rotational speed that is of nonzero values.

Furthermore, the database 41 is configured to store a plurality of compensatory torque values (A4) each of which corresponds to a respective one of ranges of values of the wind resistance detected by the resistance detecting unit 42.

It should be noted that the starting torque values and the operating torque values stored in the database 41 are predetermined by a cycle manufacturer based on statistics of experiment results which are gathered from intensive tests performed on each target model of the electric cycle 3. The intensive tests are performed according to traffic regulation testing standard of local government. Therefore, the assistance system 4 is capable of precisely regulating operation of the electric cycle 3.

The torque calculation unit 45 includes a controller 451 switchable between an aided mode and an exercise mode. The torque calculation unit 45 further includes a setting interface 450. The controller 451 may be implemented to be a microcontroller, a system on a chip (SoC), one or more central processing units (CPU) or integrated circuit (IC) chips configured to carry out the functions discussed in this disclosure. The setting interface 450 includes a screen and a button set. The setting interface 450 is configured to be operated for input of an assist ratio that is a ratio of auxiliary propulsion power to human pedal power. In one embodiment, the assist ratio thus inputted can be utilized by the controller 451 to control the torque motor 34 to drive rotation of the driving wheel 33 based on the assist ratio. In one embodiment, the setting interface 450 may be further operated for input of setting torque values that are used to replace a corresponding portion of what are stored in the database 41. The assist ratio should be assigned to comply with local regulations or laws of a region (e.g., the European Union region), and can be arbitrarily assigned whenever no restriction is imposed on the assist ratio. For example, to comply with regulations in Japan and the European Union regions, the assist ratio may be assigned such that auxiliary propulsion power and human pedal power respectively account for 75% and 25% of total power for propelling the electric cycle 3. In addition, for entertainment or exercise, a cyclist may be able to increase a percentage that the human pedal power accounts for by adjusting the assist ratio. For example, the assist ratio is changed such that the auxiliary propulsion power and the human pedal power respectively account for 60% and 40% of the total power.

Moreover, the setting interface 450 is configured to be operated for input of a resistance torque value which corresponds to torque for hindering the rotation of the driving wheel 33.

In one embodiment, the setting interface 450, the road designating module 423 and the load designating module 424 are implemented to be an integrated input device that includes button(s) or a touch screen for touch input, a microphone for audio input and/or a camera for video input. The integrated input device may be mounted to the handlebar of the cycle body 31 as the setting interface 450 shown in FIG. 1.

The brake-lever 46 is mounted on the handlebar of the cycle body 31, and is communicable with the controller 451. The brake-lever 46 is configured to be operated, e.g., by pulling the brake-lever 46 similar to pulling a brake brake-lever of a regular bicycle, to trigger the controller 451 to halt power-aid of the torque motor 34. When the brake-lever 46 is released, the operation of the torque motor 34 resumes.

Figure 3:
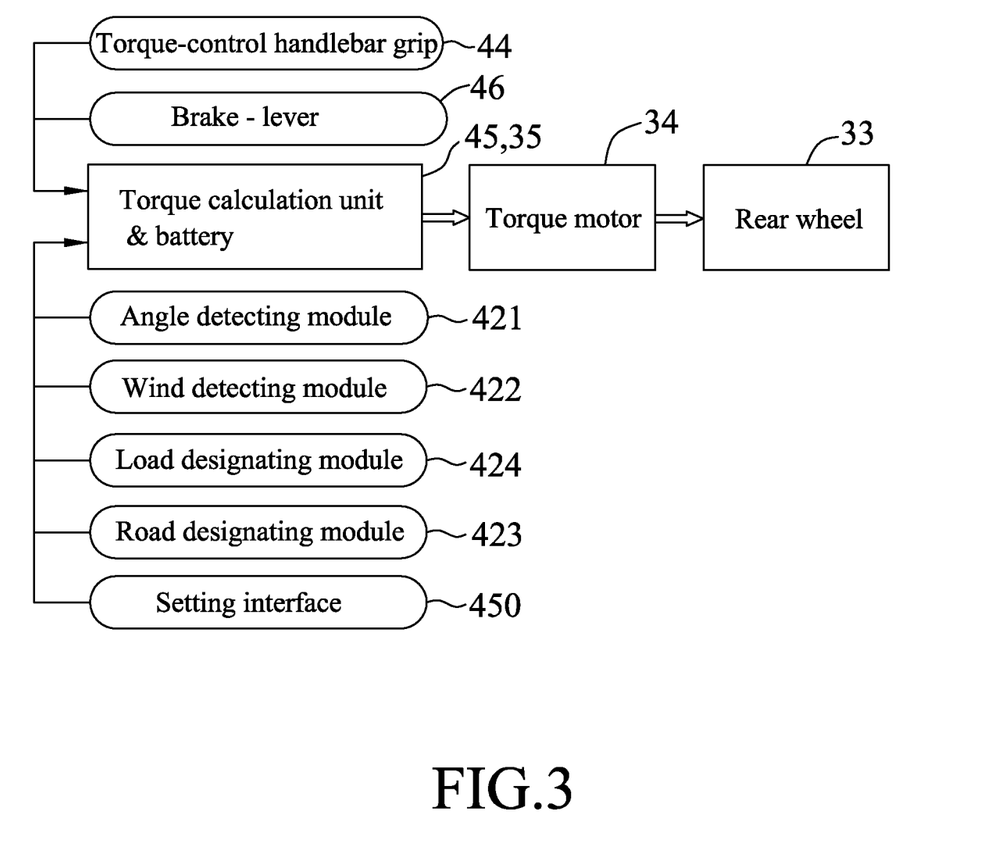
FIG. 3 is a schematic diagram illustrating an embodiment of controlling a torque motor to drive rotation of a driving wheel of the electric cycle by the assistance system according to the disclosure.
Figure 5:
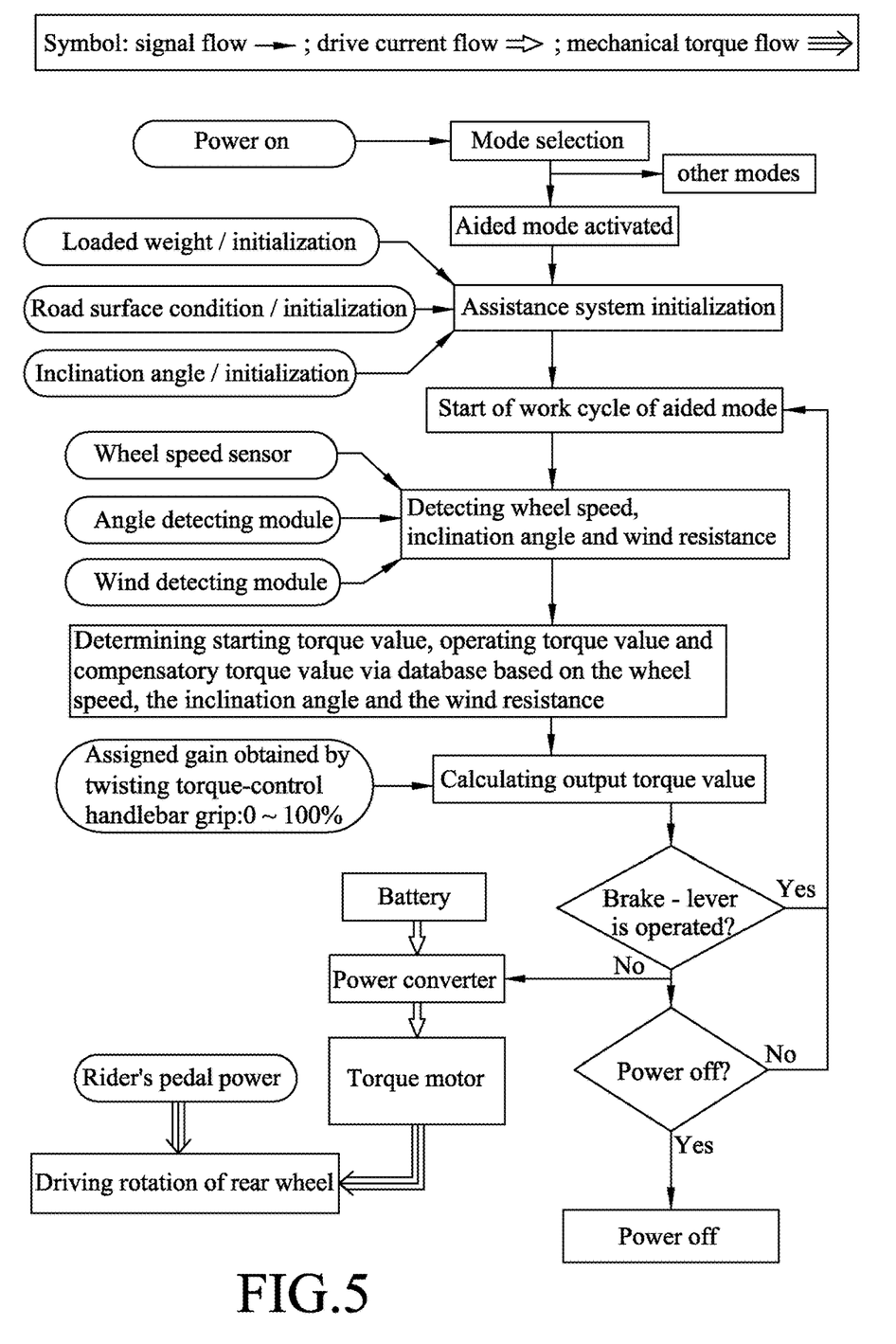
FIG. 5 is a flow chart illustrating an embodiment of an operating procedure of the assistance system according to the disclosure.
Figure 6:
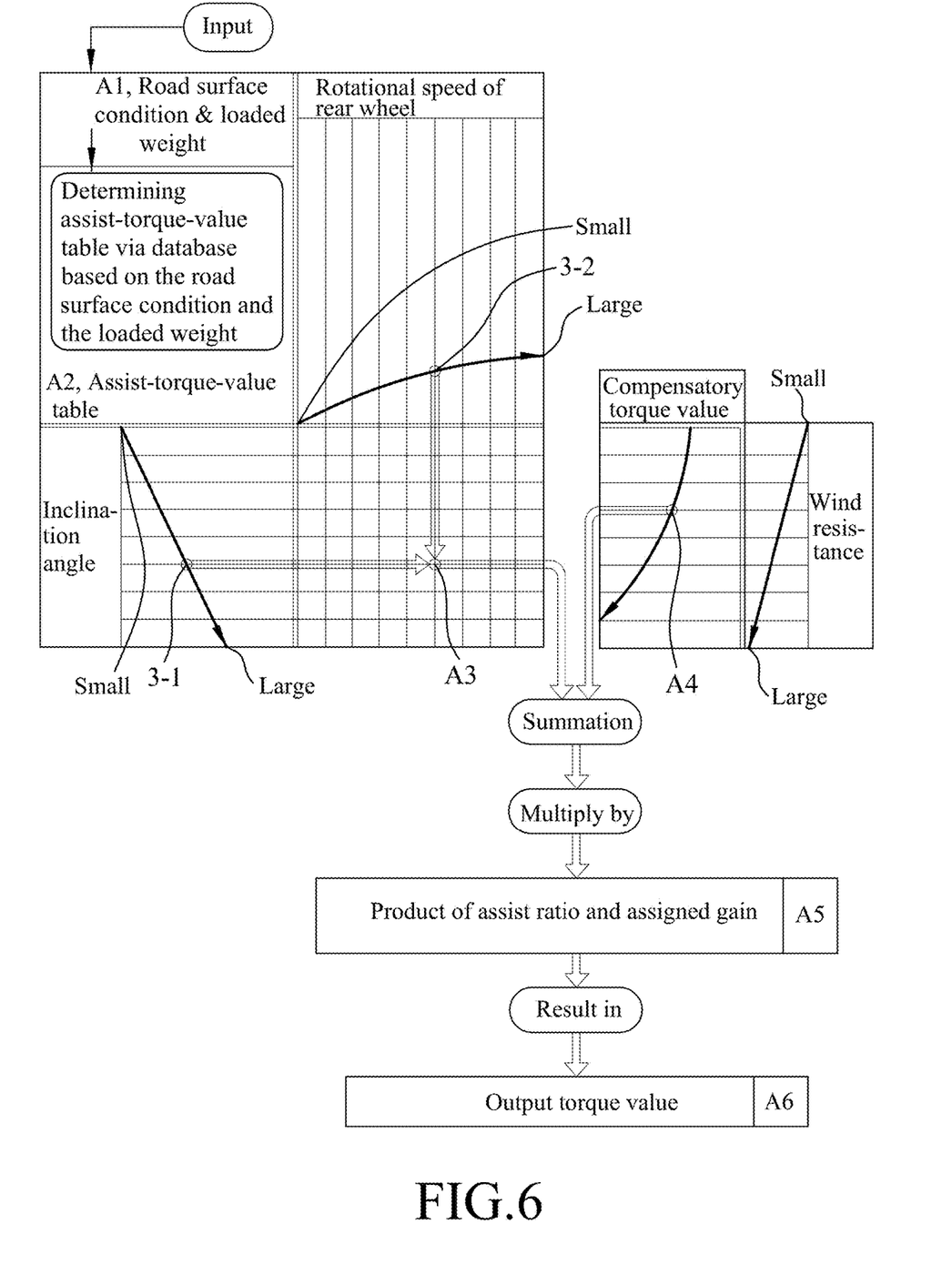
FIG. 6 is a schematic diagram illustrating an embodiment of computation of an output torque value by the assistance system according to the disclosure.

Referring to FIGS. 3, 5 and 6, an example of operating the assistance system 4 according to the disclosure is described as follows. As shown in FIG. 5, when the assistance system 4 is turned on, the cyclist is requested to select the aided mode or the exercise mode of the controller 451. When the controller 451 is switched to the aided mode, the assistance system 4 receives inputs of the road surface condition and the loaded weight designated by the rider, and proceeds to perform initialization. Any one of the road surface condition and the loaded weight that is not designated by the cyclist in a predetermined duration is automatically assigned a default value by the assistance system 4, and initialization is automatically performed afterward. Each of the road surface condition and the loaded weight may be designated (see annotation A1 in FIG. 6) by the cyclist via a corresponding one of the road designating module 423 and the load designating module 424, or may be designated to the default value when the predetermined duration has elapsed. In addition, the angle detecting module 421 is automatically providing inclination angle to the assistance system 4 (see annotation 3-1 in FIG. 6) with the aid of the angle detecting module 421 which is implemented by at least the gyroscope and the accelerometer as shown in FIG. 4. Thereafter, a flow of operating procedure enters into a work cycle of the aided mode that is executed at high frequency. At the beginning of the work cycle of the aided mode, the wheel speed sensor 43 detects the rotational speed of the driving wheel 33 (see annotation 3-2 in FIG. 6), and the wind detecting module 422 detects the wind resistance.

At the same time, as shown in FIG. 6, the controller 451 is configured to select one of the assist-torque lookup tables (A2) based on the road surface condition designated by the road designating module 423 and the loaded weight designated by the load designating module 424, and then to determine the assist torque value (A3) based on the rotational speed of the driving wheel 33 detected by the wheel speed sensor 43 and the inclination angle obtained by the angle detecting module 421 from said one of the assist-torque lookup tables selected by the controller 451. The assist torque value is one of the starting torque values when the rotational speed of the driving wheel 33 thus detected is equal to zero, and is one of the operating torque values when the rotational speed of the driving wheel 33 thus detected is not equal to zero. Moreover, the controller 451 is configured to determine one of the compensatory torque values (A4) based on the wind resistance detected by the wind detecting module 422, and to calculate a sum of said one of the compensatory torque values thus determined and the assist torque value determined by the controller 451 to serve as a compensated torque value.

The controller 451 is further configured to calculate an output torque value (A6) for driving the torque motor 34 by multiplying the compensated torque value by the assigned gain (A5) which may be designated by the cyclist in real time. It is noted that, the road surface condition, the loaded weight, the wind resistance, the assist torque value, the compensatory torque value, the assigned gain, and the output torque value may vary in real time. Thereafter, in a condition that the brake-lever 46 is not operated, the controller 451 is configured to control a power converter, which is supplied with electrical power of the battery 35 by means of pulse width modulation (PWM) techniques, so as to enable the torque motor 34 to exert torque to the driving wheel 33 for driving the rotation of the driving wheel 33 in real time based on the output torque value thus calculated.

When the brake-lever 46 is operated, the controller 451 controls the power converter to stop driving the torque motor 34, so no torque is exerted to the driving wheel 33 by the torque motor 34. When the brake-lever 46 is released, the work cycle of the aided mode resumes. The work cycle of the aided mote repeats until the assistance system 4 is turned off. It should be noted that the assistance system 4 may turn off when an abnormal emergency or an error occurs.

On the other hand, when the controller 451 is switched to the exercise mode, the controller 451 is configured to control the torque motor 34 to exert torque to the driving wheel 33 based on the resistance torque value. In addition, when the controller 451 is switched to the exercise mode, the assist ratio can be assigned via the setting interface to be a negative value so as to create a handicap for pedaling of the electric cycle 3.

In summary, the assistance system 4 according to the disclosure utilizes the wheel speed sensor 43 to obtain the rotational speed of the driving wheel 33, utilizes the resistance detecting unit 42 to obtain the external resistance factors (e.g., the inclination angle, the wind resistance, the road surface condition and the loaded weight), utilizes the setting interface 450 to set the assist ratio with a rider-friendly value, and utilizes the torque-control handlebar grip 44 to tune the assigned gain as desired. The assistance system 4 further utilizes the torque calculation unit 45 to look up, via the database 41, the assist torque value (for compensating influence of the inclined road and the loaded weight) and the compensatory torque value (for compensating influence of headwind), to calculate the compensated torque value by summing the compensatory torque value and the assist torque value, to calculate the output torque value based on a product of the compensated torque value and the assigned gain, and to control the torque motor 34 to drive rotation of the driving wheel 33 based on the output torque value.

The assistance system 4 according to the disclosure has many features described as follows. First, the starting torque values, the operating torque values and the compensatory torque values stored in the database 41 are predetermined by a cycle manufacturer based on statistics of experiment results gathered from field tests that are performed on the target model of the electric cycle 3 and that are performed according to governments-recognized standard conditions, and are reliable and practical. Second, since the output torque value is obtained according to a pre-established database, complexity of calculating the output torque value is low, resulting in efficiency of control. Third, the design of auxiliary propulsion power control of the assistance system 4 according to the disclosure adopts a feed-forward control scheme, so the auxiliary propulsion power may be provided prior to exertion of the rider's pedaling power, facilitating riding of the electric cycle 8. Fourth, the cyclist is able to adjust the output torque as desired by varying the assist ratio and the assign gain through operating the setting interface 450 and twisting the torque-control handlebar grip 44, respectively. As a result, a complex and expensive pedal torque sensor which is usually needed on a conventional electric bicycle may be omitted. The cyclist is able to ride the electric cycle 3 aided by the assistance system 4 of this disclosure with ease and without worrying about effects of strong wind and steep slopes.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An assistance system for facilitating operation of an electric cycle, the electric cycle including a cycle body, a driving wheel, a cycle drivetrain, a battery, and a torque motor adapted to exert torque to the driving wheel, said assistance system to be mounted on the cycle body and to be electrically connected to the battery and the torque motor, said assistance system comprising:
   a resistance detecting unit configured to obtain a resistance factor that works against forward movement of said electric cycle;
   a database configured to store a set of starting torque values each of which is a value of torque for initiating rotation of the driving wheel from a standstill under influence of the resistance factor, and a set of operating torque values each of which is a value of torque for maintaining the rotation of the driving wheel at a constant rotational speed under the influence of the resistance factor;
   a torque calculation unit including a controller switchable between an aided mode and an exercise mode; and
   a torque-control handlebar grip configured to be operated to trigger an assigned gain and to tune the assigned gain that is to be provided to said torque calculation unit,
   wherein said controller is configured to, when said controller is switched to the aided mode,
      determine one of the starting torque values or one of the operating torque values based on the resistance factor obtained by said resistance detecting unit to serve as an assist torque value,
      calculate a compensated torque value based on the assist torque value and the resistance factor obtained by said resistance detecting unit,
      multiply the compensated torque value by the assigned gain, to obtain an output torque value, and
      control the torque motor to drive the rotation of the driving wheel based on the output torque value.

2. The assistance system as claimed in claim 1, further comprising:
   a wheel speed sensor that is configured to detect the rotational speed of the driving wheel,
   wherein each of the operating torque values corresponds to a range of values of the rotational speed of the driving wheel, and said controller is configured to,
      when the rotational speed of the driving wheel thus detected is equal to zero, determine one of the starting torque values based on the resistance factor detected by said resistance detecting unit, and when the rotational speed of the driving wheel thus detected is not equal to zero, determine one of the operating torque values based on the resistance factor detected by said resistance detecting unit and the rotational speed of the driving wheel detected by said wheel speed sensor.

3. The assistance system as claimed in claim 1, wherein:

said resistance detecting unit includes an angle detecting module that is mounted on the cycle body; and said angle detecting module is configured to detect an inclination angle of the electric cycle with respect to a horizontal plane, the inclination angle serving as an element of the resistance factor for determination of said one of the starting torque values or one of the operating torque values to serve as the assist torque value.

4. The assistance system as claimed in claim 1, wherein:

said resistance detecting unit includes a wind detecting module that is configured to detect wind resistance received by the electric cycle to serve as an element of the resistance factor;

said database is further configured to store a plurality of compensatory torque values each of which corresponds to a respective one of ranges of values of the wind resistance detected by said resistance detecting unit; and said controller is configured to determine one of the compensatory torque values based on the wind resistance detected by said wind detecting module, and to calculate a sum of said one of the compensatory torque values and the assist torque value to obtain the compensated torque value.

5. The assistance system as claimed in claim 1, wherein:

said resistance detecting unit includes a road designating module that is configured to be operated to designate a road surface condition which serves as an element of the resistance force factor for determination of said one of the starting torque values or one of the operating torque values to serve as the assist torque value.

6. The assistance system as claimed in claim 1, wherein:

said resistance detecting unit includes a load designating module that is configured to be operated to designate a loaded weight which serves as an element of the resistance factor for determination of said one of the starting torque values or one of the operating torque values to serve as the assist torque value.

7. The assistance system as claimed in claim 1, wherein:

said setting interface is configured to be operated for input of a resistance torque value which corresponds to torque for hindering the rotation of the driving wheel; and said controller being configured to, when said controller is switched to the aided mode, control said torque motor to exert torque to the driving wheel based on the output torque value thus calculated, and when said controller is switched to the exercise mode, control said torque motor to exert torque to the driving wheel based on the resistance torque value.

8. The assistance system as claimed in claim 1, further comprising:

a brake-lever mounted on the cycle body, communicable with said controller, and configured to be operated to trigger said controller to halt power-aid of the torque motor.

9. The assistance system as claimed in claim 1, wherein the torque motor is an integrated hub motor mounted on the driving wheel or a mid-drive motor coupled to the cycle drivetrain.

10. The assistance system as claimed in claim 1, wherein the torque motor is an electric motor which is capable of driving rotation of the driving wheel.

11. The assistance system as claimed in claim 1, wherein said torque calculation unit further includes a setting interface configured to be operated for input of an assist ratio that is used by said controller to control the torque motor to drive the rotation of the driving wheel based on the assist ratio.

12. The assistance system as claimed in claim 1, wherein said torque calculation unit further includes a setting interface configured to be operated for input of setting torque values that are used to replace the starting torque values and the operating torque values stored in the database.

13. The assistance system as claimed in claim 1, the driving wheel being a rear wheel of the electric cycle, wherein said controller is configured to control the torque motor to drive the rotation of the rear wheel based on the output torque value.

14. The assistance system as claimed in claim 1, the driving wheel being a front wheel of the electric cycle, wherein said controller is configured to control the torque motor to drive the rotation of the front wheel based on the output torque value.

* * * * *